United States Patent
Hsu et al.

(10) Patent No.: US 7,050,406 B2
(45) Date of Patent: May 23, 2006

(54) APPARATUS, AND ASSOCIATED METHOD, FOR GENERATING ASSIGNMENT INFORMATION USED PURSUANT TO CHANNEL ALLOCATION IN A RADIO COMMUNICATION SYSTEM

(75) Inventors: Liangchi Hsu, San Diego, CA (US); Ilkka Niva, San Diego, CA (US); Mark W. Cheng, San Diego, CA (US); Zhigang Rong, Irving, TX (US)

(73) Assignee: Nokia Corporation, Espoo (FI)

( * ) Notice: Subject to any disclaimer, the term of this patent is extended or adjusted under 35 U.S.C. 154(b) by 172 days.

(21) Appl. No.: 10/735,266

(22) Filed: Dec. 12, 2003

(65) Prior Publication Data

US 2004/0146028 A1 Jul. 29, 2004

Related U.S. Application Data

(63) Continuation of application No. 10/185,402, filed on Jun. 28, 2002, now Pat. No. 6,665,309.
(60) Provisional application No. 60/323,805, filed on Sep. 20, 2001.

(51) Int. Cl.
*H08L 7/216* (2006.01)

(52) U.S. Cl. ............... 370/320; 370/328; 370/310; 370/340; 455/266; 455/452
(58) Field of Classification Search ............... 370/310, 370/319, 320, 328, 329, 340, 341, 342; 455/266, 455/452
See application file for complete search history.

(56) References Cited

U.S. PATENT DOCUMENTS

2002/0145988 A1 * 10/2002 Dahlman et al. ........... 370/335
2002/0151290 A1 * 10/2002 Chen ........................ 455/266
2002/0172217 A1 * 11/2002 Kadaba et al. ............. 370/443

* cited by examiner

*Primary Examiner*—Wellington Chin
*Assistant Examiner*—Raj Jain

(57) ABSTRACT

Apparatus, and an associated method, for facilitating communications in a radio communication system that utilizes shared, packet channels. One or more common control channels are defined upon a forward link extending between a network part of the radio communication system and the mobile stations thereof. Assignment information sets so generated by an assignment information generator and formatted into data frames for communication to the mobile stations. The mobile stations monitor a single shared packet control channel to receive the assignment information sent thereto upon the common shared channel.

10 Claims, 5 Drawing Sheets

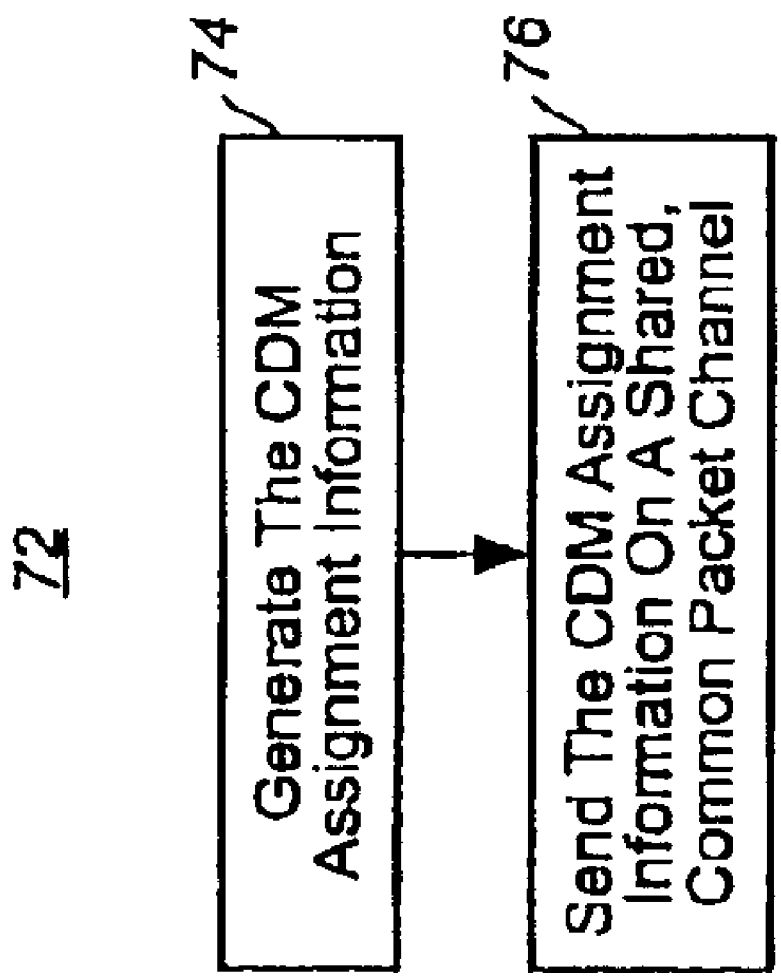

APPARATUS, AND ASSOCIATED METHOD, FOR GENERATING ASSIGNMENT INFORMATION USED PURSUANT TO CHANNEL ALLOCATION IN A RADIO COMMUNICATION SYSTEM

CROSS-REFERENCE TO RELATED APPLICATION

The present invention is a continuation of patent application Ser. No. 10/185,402, filed on 28 Jun. 2002, now U.S. Pat. No. 6,665,309, the application of which claimed the priority of provisional patent application No. 60/323,805, filed on 20 Sep. 2001.

FIELD OF INVENTION

The present invention relates generally to a manner by which to facilitate efficient radio resource utilization in a radio communication system that utilizes shared channels, such as 1×EV-DV forward shared channels defined in a CDMA 2000 cellular communication system that provides 1×EV-DV data services. More particularly, the present invention relates to apparatus, and an associated method, by which to allocate, control, and manage the shared channel through the generation of CDM (code division multiplexing) assignment information.

Efficient usage of the radio resources allocated to the radio communication system is permitted, thereby improving the communication capacity of the system as well as improving the communication performance of the communication system.

BACKGROUND OF THE INVENTION

Use of communication systems through which to communicate data between two, or more, locations is an endemic part of modern society. Communication stations are positioned at the separate locations and operate to effectuate the communication of the data.

In a minimal implementation, the communication system is formed of a first communication station, forming a sending station, and a second communication station, forming a receiving station. A communication channel interconnects the communication stations. Data that is to be communicated by the first communication station to the second communication station is converted, if necessary, into a form to permit its communication upon the communication channel. And, the second communication station operates to detect the data communicated thereto by the first communication station and to recover the informational content thereof.

In a radio communication system, the communication channel that interconnects the sending and receiving stations is formed of a radio channel, defined upon a radio link, formed upon the electromagnetic spectrum. Other, conventional communication systems generally require a fixed, wireline connection extending between the communication stations upon which to define communication channels.

As a radio link, rather than a wireline connection, is utilized upon which to define the communication channels, the need otherwise to utilize wireline connections upon which to define the communication channels is obviated. As a result, installation of the infrastructure of the radio communication system is generally less costly than the corresponding costs that would be required to construct a conventional, wireline communication system. And, mobility of the communication station can be provided, thereby to permit a radio communication system to form a mobile radio communication system.

A cellular communication system is an exemplary type of radio communication system. Cellular communication systems have been widely implemented and have achieved wide levels of usage. A cellular communication system provides for radio communications with mobile stations. The mobile stations permit telephonic communication to be effectuated therethrough. And, mobile stations are generally of sizes to permit their carriage by users of the mobile stations.

A cellular communication system includes a network part that is installed throughout a geographical area and with which the mobile stations communicate by way of radio channels defined upon radio links allocated to the communication system.

Base transceiver stations, forming portions of the network part of the communication system, are installed at spaced-apart locations throughout the geographical area that is to be encompassed by the communication system. Each of the base transceiver stations defines a cell, formed of a portion of the geographical area. And, the term cellular is derived from the cells defined by the base transceiver stations.

When a mobile station is within the cell defined by a base transceiver station, communications are generally effectuable with the base transceiver station that defines the cell. As a mobile station travels between the cells defined by different ones of the base transceiver stations, communication handoffs are effectuated to permit continued communications by, and with, the mobile station. Through appropriate positioning of the base transceiver stations, the mobile station, wherever positioned within the geographical area encompassed by the cellular communication system, shall be within close proximity of at least one base transceiver station. Therefore, only relatively low-powered signals need to be generated to effectuate communications between a mobile station and a base transceiver station. Hand-offs of communications between successive base transceiver stations, as the mobile station moves between cells, permit the continued communications without necessitating increase in the power levels at which the communication signals are transmitted. And, the low-power nature of the signals that are generated permit the same radio channels to be reused at different locations of the cellular communication system. Efficient utilization of the frequency-spectrum allocation to the cellular communication system is thereby possible.

Cellular, as well as various other, communication systems are constructed to be operable pursuant to an appropriate operating specification. Successive generations of operating specifications have been promulgated. And, corresponding generations of cellular communication networks have been installed throughout wide areas to permit telephonic communications therethrough. So-called first-generation and second-generation cellular communication networks have been widely implemented and have achieved significant levels of usage. And, installation of so-called third-generation and successor-generation systems have been proposed.

An exemplary operating specification, referred to as the CDMA 2000 specification, sets forth the operating parameters of an exemplary, third-generation communication system. The CDMA 2000 operating specification, as well as other third-generation operating specifications, provide for packet-based data communication services. The CDMA 2000 operating specification provides for high data rate communication services to be effectuated therethrough.

In a CDMA 2000 communication system, allocation of channel capacity is a mandatory aspect that must be performed to permit multiple numbers of users to access the communication system and communicate therethrough. And, due to the shared nature of the radio spectrum allocated to a communication system that utilizes code-division techniques, the allocation of channels is of particular significance. Radio channel allocation of shared resources in a multiple-user system effects the usage efficiency of the radio spectrum allocated to the communication system as well as communication performance of the communication system.

The CDMA 2000 operating specification that provides for 1×EV-DV data communications defines a high-speed forward channel upon which packet data communication services are effectuated. Multiple numbers of users with whom the high-speed data services are effectuated share the high-speed forward channel. And, the numbers of users that are permitted to utilize the forward channel varies, e.g., up to fifty users, depending upon factors including the radio conditions and dynamic traffic needs.

Two general schemes are utilized in the allocation and management of the shared channels for multiple users in the 1×EV-DV system. Namely, a time division multiplexing (TDM) scheme is set forth, and a time/code-division multiplexing (TDM/CDM) scheme is set forth. Various, and sometimes competing, framework proposals have been set forth, utilizing the different multiplexing schemes. An L3NQS scheme utilizing TDM and a 1XTREME scheme utilizing TDM/CDM have both been set forth. A TDM/CDM multiplexing scheme permits the efficiency of dealing with a mixture of different types of applications utilizing high data rate communications and low data rate communications to be increased.

TDM/CDM control schemes have been proposed in 1×EV-DV, e.g., 1XTREME. One such existing control scheme is used in the official 1XTREME framework. And, another existing scheme has been proposed as a harmonization proposal harmonizing 1XTREME and L3NQS schemes.

The 1XTREME scheme utilizes a fixed frame length channel structure. The control scheme enables multiple users to access shared forward channels simultaneously. Each user is assigned with a dedicated pointer channel that provides a pointer, pointing to a corresponding forward shared control channel. Over one forward shared control channel, information, e.g., Walsh code assignment, etc., related to one, or more, forward shared channels is carried. This scheme exhibits drawbacks, however. First, one dedicated pointer is required for each mobile station. This requirement implies that the overhead of Walsh code space and power allocation for multiple dedicated pointer channels is necessitated. And, the 1XTREME control scheme also fails to take into account the possibility that a frame can be of a variable frame length.

And, in the 1×EV-DV harmonized proposal, each mobile station monitors multiple forward shared channels to determine the forward shared channel assignments. If assigned, information carried on the forward shared control channels provides sufficient information for the mobile station to receive traffic data upon the appropriate forward shared traffic channel. In such a scheme, all of the mobile stations monitor all of the shared control channels simultaneously. And, code division modulation can be realized. The need, however, to monitor the multiple shared control channels, both while the mobile stations are in the control hold state as well as also when the mobile stations are in the active state, is energy-consumptive. And, battery depletion of mobile stations operable in such a scheme poses a problem.

Accordingly, an improved manner by which to allocate and control the shared channel in a packet radio, or other, communication system is required.

It is in light of this background information related to communications in a radio communication system that utilizes shared channels that the significant improvements of the present invention have evolved.

SUMMARY OF THE INVENTION

The present invention, accordingly, advantageously provides apparatus, and an associated method, by which to facilitate efficient radio resource utilization in a radio communication system that utilize shared channels.

Through operation of an embodiment of the present invention, a manner is provided by which to allocate, control, and manage the shared channel through the generation of CDM (code division multiplexing) assignment information. Through such channel allocation, control, and management, efficient usage of the radio resources allocated to the radio communication system is permitted, thereby improving the communication capacity of the system and improving system efficiency.

In one aspect of the present invention, an allocation scheme is provided in which a single common, shared control channel is utilized for all of the mobile stations. Each mobile station, whether in a packet-data active state or a packet-data control hold state, monitors the shared, common control channel for CDM channel allocation information. Multiple sets of CDM assignment information is sent on this shared, common control channel to be provided to the mobile stations. And, a single spreading factor is utilized.

Because the mobile stations need only monitor a single shared, common control channel, the power required of the mobile station to monitor the single, shared, common control channel is minimized.

In another aspect of the present invention, assignment of a single, shared common control channel is again assigned and utilized by all of the mobile stations to obtain CDM channel allocation information. The frame length of the frames of the CDM channel allocation information into which such channel allocation information is formatted need not be of a fixed frame length. Rather, the frame length is permitted to be of a variable frame length. Increased system flexibility is permitted through the capability of formatting the assignment information into a frame of a variable frame length. A single spreading factor is also, again, utilized.

In another aspect of the present invention, a plurality of two, or more, common, shared control channels are utilized and CDM assignment information is communicated thereon. Each mobile station is assigned to a selected, shared control channel, thereby to permit the mobile station to monitor a single shared, control channel, i.e., the shared, control channel that is assigned to the particular mobile station.

In another aspect of the present invention, the multiplicity of common, shared control channels is again utilized. And, further, the CDM assignment information is formatted into frames of variable frame lengths. By forming the CDM assignment information into frames of selectable frame lengths, the flexibility of the control mechanism provided to the communication system is improved.

In the exemplary implementation, one of the aforementioned control schemes is implemented in a CDMA 2000 communication scheme that provides for high data-rate communications. Mobile stations register with the communication system pursuant to registration procedures. Responsive to registration of a mobile station to the communication system, CDM control information is sent to the mobile station. The mobile station monitors a common, shared control channel to which the mobile station is assigned to receive CDM assignment information thereon. Because only a single channel is monitored by the mobile station, reduced energy consumption is required of the mobile station pursuant to monitoring of control information, required pursuant to operation of the mobile station in the communication system. The effectuation of high-data-rate communication with the mobile station is thereby facilitated.

In these and other aspects, therefore, apparatus, and an associated method, is provided for a radio communication system. During operation of the radio communication system, code division multiplexed data is communicated between a network part and a plurality of communication stations including a first station and at least a second station. Communication of the data upon at least a first shared channel is facilitated. A CDM (code division multiplexing) assignment information generator generates CDM assignment information. The CDM assignment information forms a first multiple assignment information set and at least a second multiple assignment information set for communications with each of the first station and the at least the second station.

A more complete appreciation of the present invention and the scope thereof can be obtained from the accompanying drawings that are briefly summarized below, the following detailed description of the presently preferred embodiments of the invention, and the appended claims.

BRIEF DESCRIPTION OF THE DRAWINGS

FIG. 5 illustrates a method flow diagram listing the method steps of the method of operation of an embodiment of the present invention.

DETAILED DESCRIPTION

Figure 1:
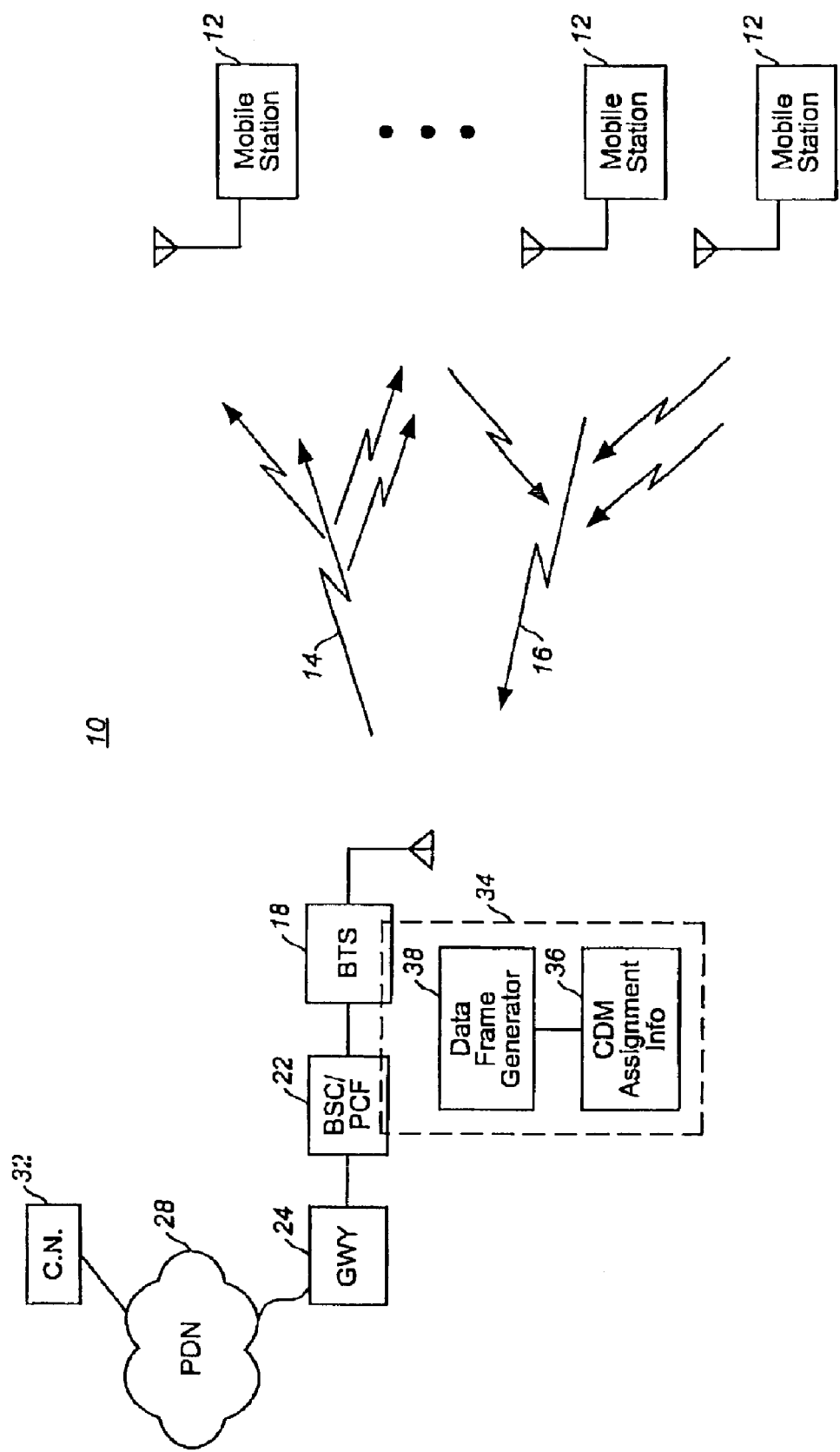
FIG. 1 illustrates a functional block diagram of a radio communication system in which an embodiment of the present invention is operable.

Referring first to FIG. 1, a radio communication system, shown generally at 10, provides for radio communications with mobile stations, of which several mobile stations 12 are shown in the figure. In the exemplary implementation, the communication system forms a cellular communication system operable, generally, pursuant to a CDMA 2000, cellular operational specification. The teachings of the present invention are, however, also implementable in any of various other types of communication systems in which multicast and broadcast communication services are implemented. Accordingly, while the following description shall describe operation of an embodiment of the present invention with respect to its implementation in a CDMA 2000 communication system, the present invention is analogously also operable in other types of communication systems.

The mobile stations 12 communicate by way of radio links with a network part of the communication system. The radio links are represented here by a forward link 14 and a reverse link 16. Radio channels are defined upon the forward and reverse links. And, more particularly, both control channels and data channels are defined upon the radio links.

The network part of the communication system includes a base transceiver station (BTS) 18. Both the base transceiver station and the mobile station form radio transceivers capable of transducing radio signals therebetween by way of radio channels defined upon the forward and reverse links 14 and 16. The base transceiver station forms part of a radio access network portion of the network part of the communication system. And, the radio access network part of the communication system is here shown further to include a base station controller/packet control function (BSC/PCF) 22 and a radio gateway (GWY) 24. The BSC/PCF is coupled between the base transceiver station and the radio gateway.

The gateway forms a gateway with a fixed-network part, here represented by a packet data network (PDN) 28. A correspondent node (CN) 32 is coupled to the network 28 and is representative of a communication node with which communications are effectuable with the mobile stations 12. The correspondent node is formed, for example, of a data server at which data that is to be communicated to the mobile station is sourced.

The network part of the communication system includes apparatus 34 of an embodiment of the present invention. The apparatus is implemented at any desired location of the network part, such as, here, at the base station controller or base transceiver station, or distributed therebetween.

The apparatus 34 here includes a CDM (code division multiplexing) assignment information generator 36 and a data frame generator 38 coupled thereto. The CDM assignment information generator generates CDM assignment information for communication to the mobile stations 12. Separate information sets are generated for different ones of the mobile stations. And, once generated, the assignment information is provided to the data frame generator 38. The data frame generator operates to format the assignment information sets into frames that are communicated to the mobile stations. In one implementation, the data frames are of fixed frame sizes, such as frame sizes corresponding to five millisecond (ms) time durations. In another implementation, the frame lengths of the frames formed by the data frame generator are of variable lengths, dependent upon the number of multiple assignment information sets, and corresponding mobile stations that are to receive the informational content of the individual ones of the assignment information sets.

Figure 2:
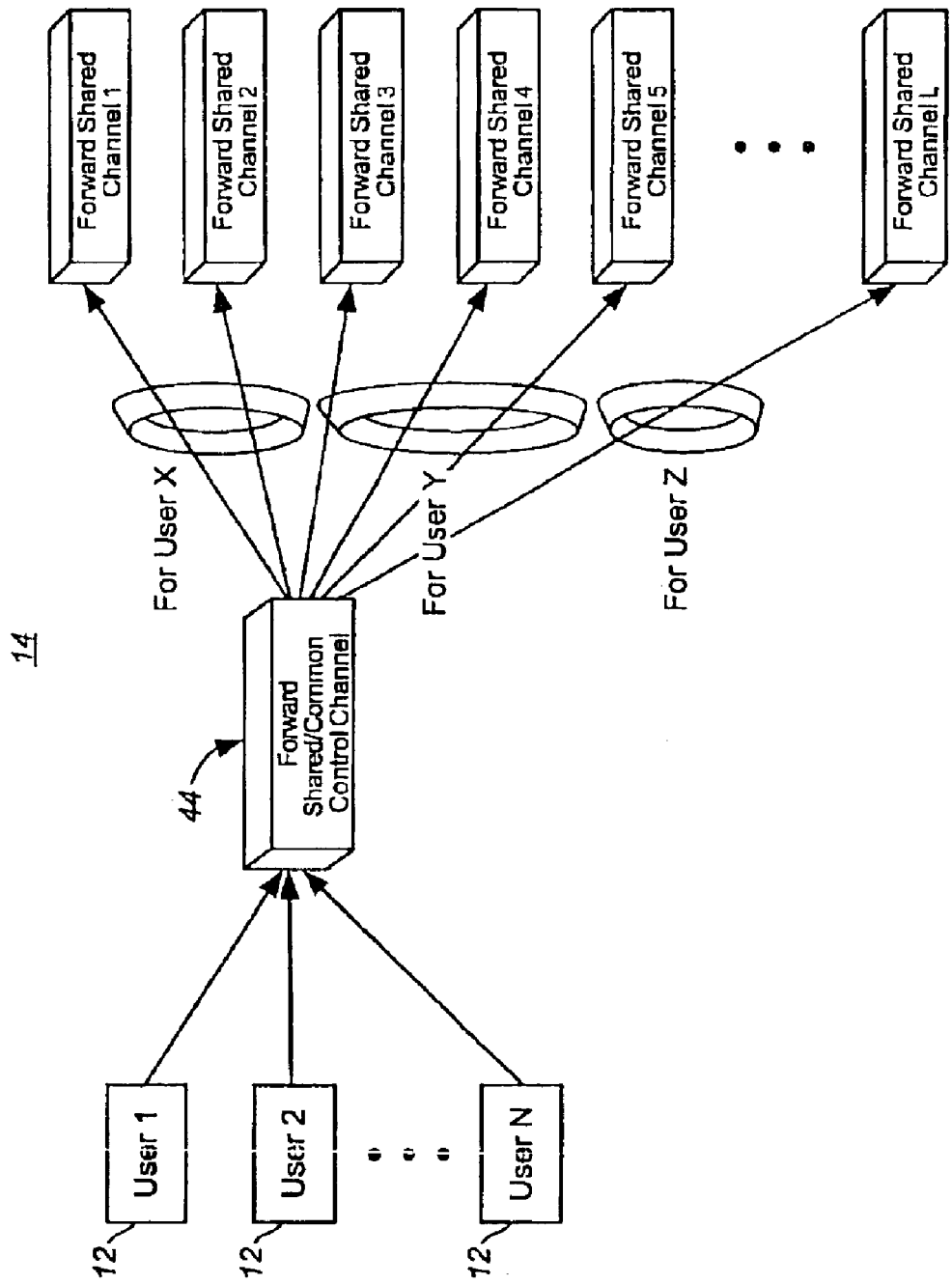
FIG. 2 illustrates a representation of an exemplary control channel defined pursuant to operation of an embodiment of the present invention and implemented in the radio communication system shown in FIG. 1.

FIG. 2 illustrates a representation of a control channel defined pursuant to an embodiment of the present invention, and upon which CDM assignment information generated by the CDM assignment information generator 36, shown in FIG. 1, is communicated to provide the mobile stations with necessary information to operate in the radio communication system. The control channel defined pursuant to an embodiment of the present invention, and shown in the figure, utilizes a mixed CDM/TDM techniques.

As indicated, the mobile stations 12 all utilize a common/shared control channel 44. The TDM nature of the channel is also designate by blocks in the Figure.

The control channel defined pursuant to an embodiment of the present invention and shown in FIG. 2 builds upon existing 1XTREME and 1×EV-DV schemes in manners that reduce the complexity of the existing schemes while also reducing the requirements of the mobile station to monitor multiple channels, thereby reducing the power requirements of the mobile station.

In the first implementation, the frames generated by the data frame generator 38, shown in FIG. 1, are of common lengths. The common sizes facilitate simplicity of detection by individual ones of the mobile stations of the assignment information sets designated for the respective ones of the mobile stations. All mobile stations 12 continuously monitor the shared, common control channel for CDM channel allocation information. The channel is monitored, in the exemplary implementation, both when the mobile station is in a packet-data active state and when the mobile stations are in the packet-data control hold states. Multiple sets of the CDM assignment information are carried on the control channel for multiple users, i.e., mobile stations, simultaneously. The number of sets, e.g. four alternately, is a configurable number, selectable as a system parameter. For instance, in one implementation, 82 percent of near-real-time (NRT) packets are transmitted with three, or fewer, codes and 76 percent of WAP (wireless access protocol) packets are transmitted using three or fewer codes. Assuming availability of fourteen Walsh codes upon the forward-shared packet data channels, four users, i.e., 14/3, are able to utilize CDM communications simultaneously. And, accordingly, four sets of channel allocation/assignment information is utilized.

In the exemplary implementation, a single, spreading factor is utilized, e.g., a spreading factor of sixty-four. If the number of information sets embodied in the control channel is fewer than four, repetitive transmission of one or more of the assignment information sets is performed.

Through use of the shared channel, battery life of the mobile station is enlarged as the mobile station is required to monitor only one shared/common control channel. And, in an implementation in which the frame sizes of the frames containing the assignment information sets are of set lengths, mobile-station complexity is reduced as multiple frame sizes are not utilized on the shared control channel. And, as only a single spreading factor needs to be utilized, as well as a fixed data rate, implementation complexity is reduced and information reliability is increased.

In another implementation, the frames generated by the frame generator are selectably of variable frame lengths, i.e., of frame lengths that differ with the base line frame length of five ms. And, when the frame length of the frames are of a frame length that differs with the base line frame length, the spreading factor that is utilized is a variant, varying by a variation factor, with the spreading factor utilized with a scheme that utilizes a fixed frame length. For instance, if the spreading factor is 64 times N is used for frames of five ms in length, then a spreading factor of sf 64 times N/2 is used when the frame lengths are of frames corresponding to 2.5 ms time periods. N is a configurable parameter.

In another implementation, two, or more, common/shared control channels are utilized. Each mobile station 12 is assigned with a shared control channel of the two or more shared control channels, such as by way of a layer 3 message allocated thereto when the mobile station registers with the system. The mobile stations again are required merely to monitor a single shared channel. The layer 3 message is a higher-level logical layer, positioned above the physical layer of the system.

In one such implementation, the frame links of the frames generated by the frame generator and communicated upon the control channel or of fixed frame links, such as frame links corresponding to a 5 ms time period. And, in another implementation, the frame links are of variable lengths. When a scheme is utilized in which the frame links are of variable sizes, and two or more common, shared control channels are utilized, the mobile stations are provided with information indicating which control channel that the mobile station should monitor upon registration with the system, such as by delivery to the mobile station of a layer 3 (L3) message or other higher-level message.

Figure 3:
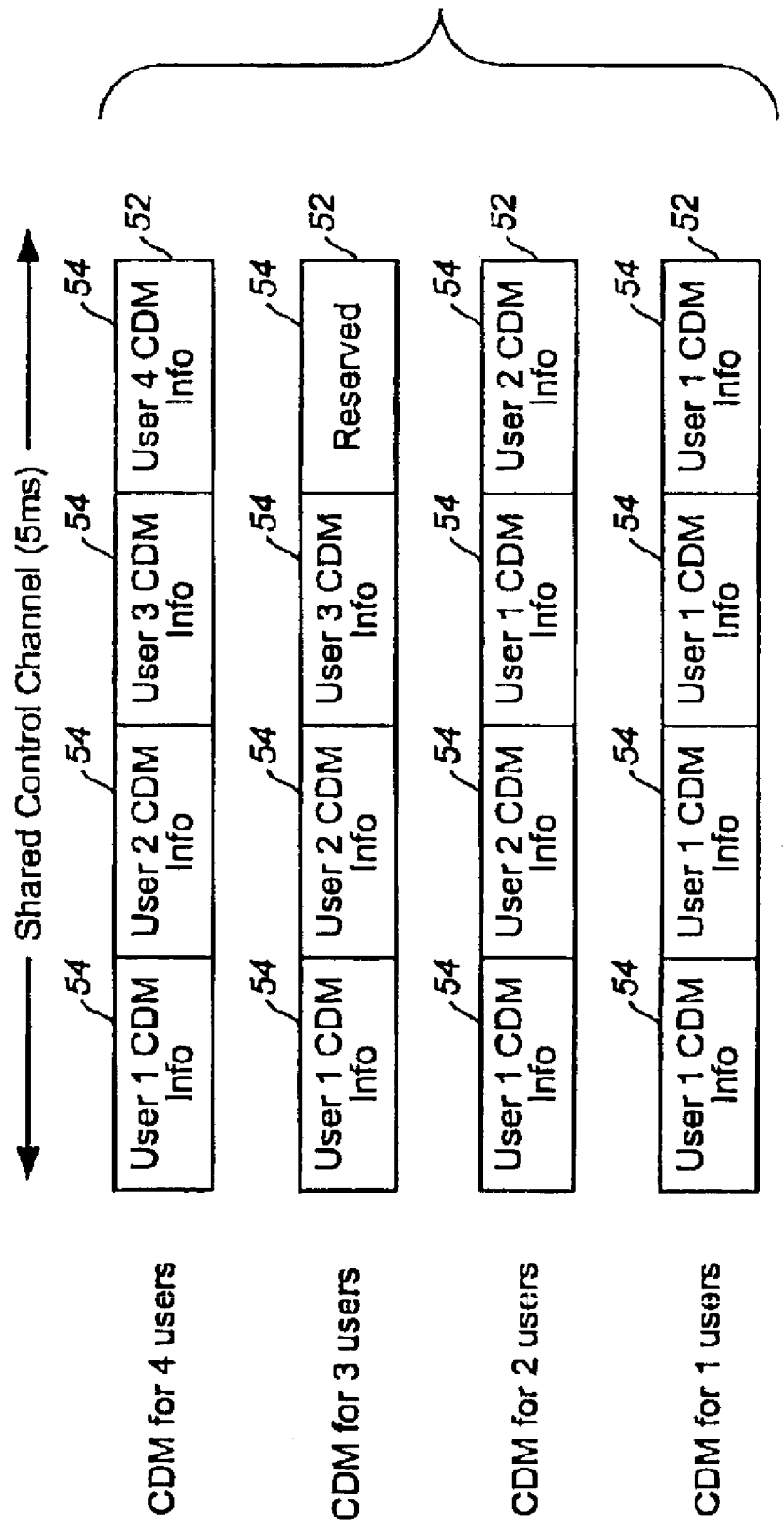
FIG. 3 illustrates exemplary repetition patterns of CDM assignment information communicated upon the control channel shown in FIG. 2, variously for a single user, and increased numbers of users.

FIG. 3 illustrates repetition patterns of various frames, here designated at 52 pursuant to operation of the apparatus 34. The top-most (as shown) frame 52 indicates the repetition pattern when there are four users, i.e., mobile stations, that are to receive assignment information therefrom. The frame is divided into four portions 54, each containing an assignment information set for a particular one of the four mobile stations. Four separate assignment sets are indicated in the top-most frame 52. The frame 52 positioned directly therebeneath (as shown) indicates the repetition pattern when three users are to receive CDM assignment information. Here, the assignment information sets 54 are allocated to the three users and a fourth of the assignment sets is a reserved assignment set.

And, positioned therebeneath is a frame 52 representative of the repetition pattern when two users are to receive the CDM assignment information. Here, the information to each of the two users is repeated within the frame. And, the bottom-most (as shown) frame 54 indicates the repetition pattern when only a single user, i.e., mobile station, is tuned to receive the assignment information. Here, the assignment information set is repeated in each of the portions 54 of the frame.

Figure 4:
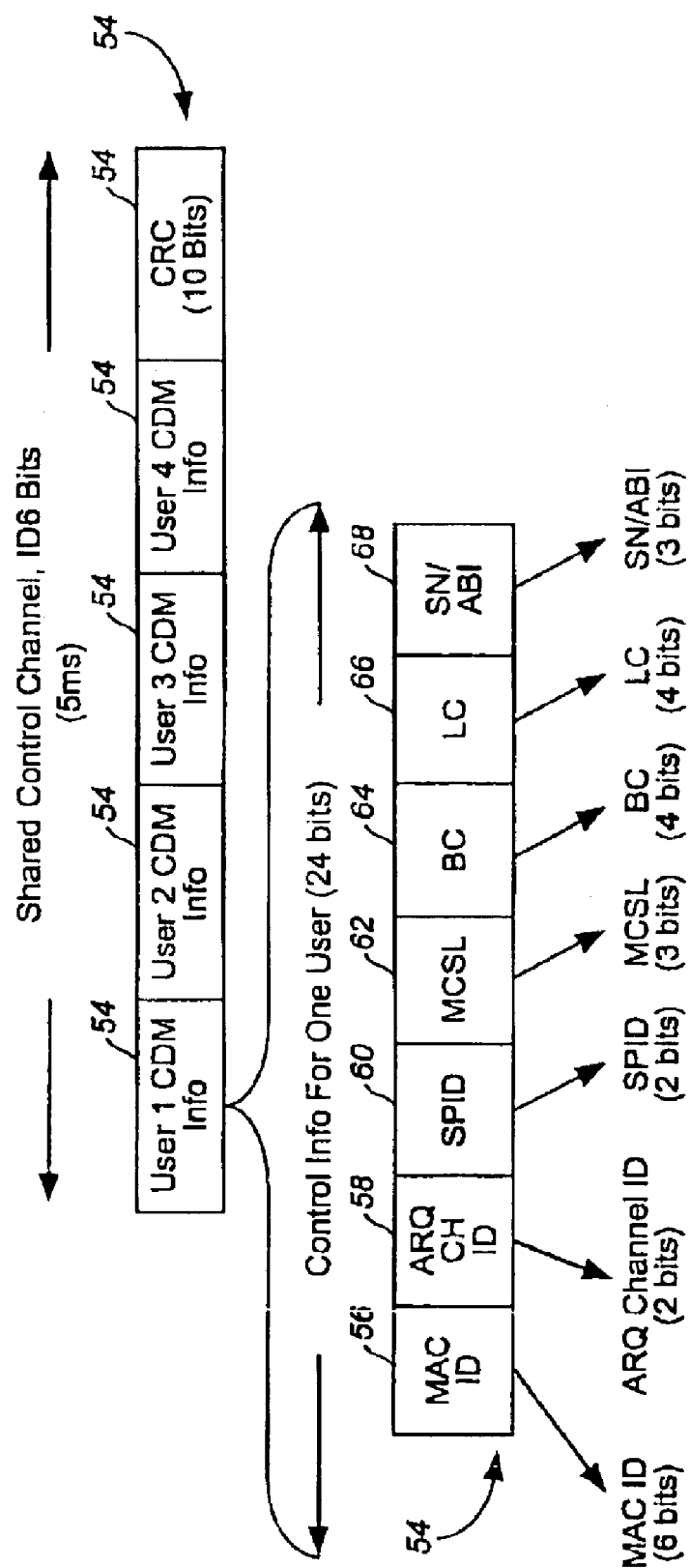
FIG. 4 illustrates exemplary information contained in the CDM allocation information communicated to a particular mobile station operable in the radio communication system shown in FIG. 1.

FIG. 4 illustrates in greater detail the informational content contained in a single assignment information set 54. Here, the set is of a twenty-four bit length divided into seven fields, fields 56, 58, 60, 62, 64, 66, and 68. The field 56 is a sixth-bit length mac id field. The field 58 is a two-bit ARQ channel id field. The field 68 is a two-bit sbid field and the field 62 is a 3-bit mcsl field. The field 64 is a four-bit bc field; the field 66 is a four-bit lc field; and the field 68 is an sn/abi field of a three-bit, bit length. Details pertaining to the values that populate such fields are contained in the appropriate CDMA 2000 specification.

Because the mobile station is required to monitor only a single-shared channel, improved system performance is possible as the radio resources of the communication system are efficiently utilized.

FIG. 5 illustrates a method flow diagram, shown generally at 72, of the method of operation of an embodiment of the present invention. The method operates to facilitate communication of data in a radio communication system in which code division multiplex data is communicated between a network part and a plurality of mobile stations.

First, and as indicated by the block 74, CDM (code division multiplexing) assignment information is generated at the network part. The CDM assignment information forms a first multiple assignment information set and at least a second multiple information assignment set for communication with each of the first mobile station and the at least second mobile station. Then, and as indicated by the block 76, the CDM assignment information is sent to the first and at least second mobile stations upon the at least the first shared channel.

The previous descriptions are of preferred examples for implementing the invention, and the scope of the invention should not necessarily be limited by this description. The scope of the present invention is defined by the following claims:

We claim:

1. Apparatus for facilitating effectuation of code division multiple access data services between a network part and a first plurality of communication stations including a first station and at least a second station, upon selected traffic channels said apparatus comprising:

a CDM (code division multiplexing) assignment information generator for generating CDM assignment information, the CDM assignment information forming a first multiple assignment information set for use by the first station and at least a second multiple assignment information set for use by the at least the second station;

a data frame generator adapted to receive the CDM assignment information generated by said CDM assignment information generator, said data frame generator for generating data frames of selected frame lengths that contain the CDM assignment information, the data frames, once generated, for communication upon a common control channel, the common control channel monitored by the communication stations of the first plurality, thereby providing to the communication stations assignment information identifying traffic channels upon which the code division multiple access services are effectuated with respective one of the first and at least second communication stations of the first plurality.

2. The apparatus of claim 1 wherein the selected frame lengths of the data frames formed by said data frame generator are of fixed lengths.

3. The apparatus of claim 1 wherein the selected frame lengths of the data frames formed by said data frame generator are of variable lengths.

4. The apparatus of claim 1 wherein the first and at least second communication stations, respectively, register with the network part pursuant to a registration scheme and wherein the CDM assignment information generated by said CDM assignment information generator is generated responsive to effectuation of registration of respective ones of the first and at least second mobile stations.

5. The apparatus of claim 1 wherein the network part and the first plurality comprise a cellular communication system operable generally pursuant to a CDMA 2000 operating specification providing for 1xEV-DV data communications, wherein the cellular communication system is defined in terms of logical layers including a physical layer and at least one higher-level logical level, and wherein said CDM assignment information generator is embodied at the higher-level logical layer.

6. The apparatus of claim 5 wherein the CDM assignment information generated by said CDM assignment information generator forms formatted messages formed of message parts, the message parts concatenated together to form the message, individual ones of the message parts associated with individual ones of the first plurality.

7. A method for facilitating effectuation of code division multiplied data services between a network part and a first plurality of communication stations including a first mobile station and at least a second mobile station, upon selected channels, said method comprising the operations:

generating CDM assignment information at the network part, the CDM assignment information forming a first multiple assignment information set for use by the first mobile station and at least a second multiple information assignment set for use by communicating with each of the first mobile station and the at least the second mobile station, respectively;

forming data frames of selected frame lengths that contain the CDM assignment information; and sending the CDM assignment information generated during said operation of generating to the first and the at least second mobile stations upon shared common control channel, the common control channel monitored by the mobile stations of the first plurality, thereby providing to the mobile stations assignment information identifying traffic channels upon which the code division multiple access services are effectuated with respective ones of the first and at least second mobile stations of the first plurality.

8. The method of claim 7 further comprising the preliminary operation of:

registering the first and at least second mobile stations with the network part pursuant to a system protocol, and wherein said operation of generating is performed responsive to registration performed during said operation of registering.

9. The method of claim 7 wherein the data frames formed during said operation of forming are of fixed lengths.

10. The method of claim 9 wherein the data frames formed during said operation of forming are of variable lengths.

* * * * *